(12) United States Patent
Herzberg et al.

(10) Patent No.: US 10,903,986 B2
(45) Date of Patent: Jan. 26, 2021

(54) CRYPTOGRAPHIC KEY MANAGEMENT FOR END-TO-END COMMUNICATION SECURITY

(71) Applicant: Karamba Security, Hod Hasharon (IL)

(72) Inventors: Amir Herzberg, Hod Hasharon (IL); Assaf Harel, Ramat Hasharon (IL); Eli Mordechai, Modiin (IL); Tai Efraim Ben David, Hogla (IL); Amiram Dotan, Birmingham, MI (US); David Barzilai, Hod Hasharon (IL); Itay Khazon, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

(21) Appl. No.: 16/251,135

(22) Filed: Jan. 18, 2019

(65) Prior Publication Data

US 2020/0007319 A1    Jan. 2, 2020

Related U.S. Application Data

(63) Continuation of application No. 16/020,323, filed on Jun. 27, 2018, now Pat. No. 10,243,732.

(51) Int. Cl.
*H04L 29/06* (2006.01)
*H04L 9/08* (2006.01)
(Continued)

(52) U.S. Cl.
CPC ............ *H04L 9/0819* (2013.01); *G06F 21/45* (2013.01); *G06F 21/606* (2013.01); *G06F 21/71* (2013.01);
(Continued)

(58) Field of Classification Search
CPC ........ G06F 21/45; G06F 21/44; G06F 21/445; G06F 21/70; G06F 21/71; G06F 21/73;
(Continued)

(56) References Cited

U.S. PATENT DOCUMENTS

| 9,705,678 | B1 | 7/2017 | Wang |
| 2015/0089236 | A1 | 3/2015 | Han |

(Continued)

*Primary Examiner* — Edward Zee
(74) *Attorney, Agent, or Firm* — Finnegan, Henderson, Farabow, Garrett & Dunner, LLP

(57) ABSTRACT

Technology can be used for sending and receiving messages on a CAN bus with a plurality of ECUs. The technology can include identifying a first message to send to a receiving ECU from a sending ECU; incrementing a sender-version message counter for the message type; determining to create a second session for the message type in the sending ECU; generating a second sender-version session key to be used during the second session in the sending ECU; and resetting the sender-version message counter. The technology further includes processing the first message using the second sender-version session key, including performing an operation to combine the sender-version message counter with the first message to create a combined message and encoding the combined message using the second sender-version session key to create an encoded message. The technology further includes sending the encoded message to the receiving ECU on the CAN bus.

20 Claims, 14 Drawing Sheets

(51) Int. Cl.
  *H04L 9/06* (2006.01)
  *G06F 21/71* (2013.01)
  *G06F 21/45* (2013.01)
  *H04L 29/08* (2006.01)
  *G06F 21/60* (2013.01)
  *H04W 4/48* (2018.01)
  *H04L 9/14* (2006.01)
  *H04W 4/70* (2018.01)

(52) U.S. Cl.
  CPC ............ *H04L 9/0618* (2013.01); *H04L 9/085* (2013.01); *H04L 9/0861* (2013.01); *H04L 9/14* (2013.01); *H04L 63/0435* (2013.01); *H04L 63/06* (2013.01); *H04L 63/062* (2013.01); *H04L 63/08* (2013.01); *H04L 67/12* (2013.01); *H04L 67/141* (2013.01); *H04W 4/48* (2018.02); *H04L 2209/84* (2013.01); *H04W 4/70* (2018.02)

(58) Field of Classification Search
  CPC ....... H04L 63/06; H04L 63/065; H04L 63/08; H04L 63/0876
  See application file for complete search history.

(56) References Cited

U.S. PATENT DOCUMENTS

2018/0084412 A1\* 3/2018 Alfred .................... H04L 67/28
2018/0205729 A1\* 7/2018 Carlesimo ......... H04W 12/0609

\* cited by examiner

US 10,903,986 B2

CRYPTOGRAPHIC KEY MANAGEMENT FOR END-TO-END COMMUNICATION SECURITY

CROSS-REFERENCE TO RELATED APPLICATION

This application is a continuation of, and claims priority to, U.S. patent application Ser. No. 16/020,323, filed on Jun. 27, 2018, which is expressly incorporated herein by reference in its entirety.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems. When IoT devices include multiple controllers, in some instances the controllers communicate over an internal network within the IoT device (e.g., CAN bus).

Like any other externally connected computers, IoT devices (e.g., ECUs in connected cars) are vulnerable to cyber-attacks and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber-attacks come in many forms and flavors, but they generally share the same basic concepts: find a preexisting security bug (vulnerability) in a system or a network, exploit it, and perform malicious actions (e.g., running malware, eavesdropping on communications, spoofing the identity of others). For example, network communication that uses a common transmission medium (e.g., a bus) to broadcast messages among network participants can be susceptible to network participants spoofing the identity of others on the network (e.g., transmitting messages with the sender field having been modified so that the messages appear to originate from another device on the network).

SUMMARY

This document generally describes a technological solution for managing and synchronizing keys that are used to provide end-to-end communication security for controllers (e.g., ECUs) communicating with each other over a common communication network (e.g., CAN bus, LINBus, FlexRay channels, Ethernet), such as multiple controllers communicating with each other over a bus within an IoT device (e.g., connected automobile). End-to-end communication security can help secure communication over a common communication network so that senders and recipients are able to verify the authenticity of the other end of the communication, and to obfuscate the contents of the communication (e.g., encode) so that they are only viewable to the sender and receiver (and not to any other controllers/devices on the communication network). End-to-end communication security can be provided in a variety of ways, such as by having every controller that transmits and receives a broadcast message on a network (e.g., CAN bus) generate a symmetric key that can then be used to verify and authenticate encoded communication between only the those controllers, while also obfuscating the communication from the other controllers on the communication network.

Symmetric keys can be used in combination with a changing value, such as counters or other values that change over the course of exchanging messages between controllers, to vary the manner in which content is obfuscated between controllers. Controllers that are communicating with each other using these shared secrets—symmetric key and changing value—can communicate with each other without transmitting information about either the symmetric key or the changing value. However, if either one of these shared secrets falls out of sync between the controllers communicating using these values, the ability of the two controllers to securely communicate with each other can be compromised. This document generally describes technology for controllers to use to identify when they have fallen out of sync with other controllers with regard to shared secrets and, when they have fallen out of sync, how to reestablish synchronization between the controllers. As described below, this can be accomplished without the controllers conveying information regarding the shared secrets between each other, and without including additional information in network communications to permit controllers to establish and maintain synchronization.

In one implementation, a method for sending and receiving messages on a controller area network (CAN bus) in an automotive vehicle across which a plurality of electronic control units (ECU) can be used. The method includes identifying a first message to send to a receiving ECU from a sending ECU, the first message being of a particular message type, the sending ECU in a first session that has a first sender-version session key; incrementing a sender-version message counter for the message type; determining, based on the sender-version message counter, to create a second session for the message type in the sending ECU, including incrementing a sender-version session counter for the message type; generating a second sender-version session key to be used during the second session in the sending ECU; and resetting the sender-version message counter. The method further includes processing the first message using the second sender-version session key, including performing an operation to combine the sender-version message counter with the first message to create a combined message; and encoding the combined message using the second sender-version session key to create an encoded message. The method further includes sending the encoded message to the receiving ECU on the CAN bus.

In one implementation, a system for sending and receiving messages on a controller area network (CAN bus) in an automotive vehicle across which a plurality of electronic control units (ECU) communicate can be used. The system includes a processor and a computer-readable memory, the memory containing instructions, that, when executed by the processor, cause the processor to perform operations including identifying a first message to send to a receiving ECU from a sending ECU, the first message being of a particular message type, the sending ECU in a first session that has a first sender-version session key; incrementing a sender-version message counter for the message type; determining, based on the sender-version message counter, to create a second session for the message type in the sending ECU, including incrementing a sender-version session counter for the message type; generating a second sender-version session key to be used during the second session in the sending ECU; and resetting the sender-version message counter. The operations further include processing the first message using the second sender-version session key, including performing an operation to combine the sender-version message counter with the first message to create a combined message; and encoding the combined message using the second sender-version session key to create an encoded message. The operations further includes sending the encoded message to the receiving ECU on the CAN bus.

In one implementation, a non-transitory, computer-readable storage medium includes instructions that that, when executed by a processor, cause the processor to perform operations for sending and receiving messages on a controller area network (CAN bus) in an automotive vehicle across which a plurality of electronic control units (ECU) communicate. The operations include identifying a first message to send to a receiving ECU from a sending ECU, the first message being of a particular message type, the sending ECU in a first session that has a first sender-version session key; incrementing a sender-version message counter for the message type; determining, based on the sender-version message counter, to create a second session for the message type in the sending ECU, including incrementing a sender-version session counter for the message type; generating a second sender-version session key to be used during the second session in the sending ECU; and resetting the sender-version message counter. The operations further include processing the first message using the second sender-version session key, including performing an operation to combine the sender-version message counter with the first message to create a combined message; and encoding the combined message using the second sender-version session key to create an encoded message. The operations further includes sending the encoded message to the receiving ECU on the CAN bus.

Various implementations can include one, none, or some of the following. Receiving the encoded message, by the receiving ECU, from the CAN bus, the receiving ECU in a first session that has a first receiver-version session key, the first receiver-version session key matching the first sender-version session key; incrementing a receiver-version message counter for the message type; determining, based on the receiver-version message counter, to create the second session for the message type in the receiving ECU, including incrementing a receiver-version session counter for the message type; generating a second receiver-version session key to be used during the second session in the receiving ECU, the second receiver-version session key matching the second sender-version session key; and resetting the receiver-version message counter. Processing the encoded message using the second receiver-version session key, including identifying a cipher based on the message type; using the cipher and the second receiver-version session key to decode the encoded message to create decoded data; performing the operation on the decoded data to extract the first message; validating the extracted first message; and in response to determining that the extracted first message is valid, providing the extracted first message to a target application in the receiving ECU; and in response to determining that the extracted first message is invalid, generating an alert. The operation is a logical exclusive-or operation. The sender-version message counter is encoded with a master key for the message type before being combined with the first message. Determining to create the second session is based on the sender-version message counter being more than a predefined maximum session length for the message type. Identifying a second message to send to the receiving ECU, the second message having a second message type that is different from the particular message type, the second message type being associated with a different sender-version message counter, a different receiver-version session counter, a different sender-version session counter, a different receiver-version session-counter, and a different predefined maximum session length than the particular message type. Identifying a third message to send to the receiving ECU from the sending ECU, the third message being of the particular message type; incrementing the sender-version message counter for the message type; determining, based on the sender-version message counter, to not create a new third session for the message type; processing the second message using the second sender-version session key to create a second encoded message; and sending the second encoded message to the receiving ECU on the CAN bus. The sender-version message counter and the receiver-version message counter are the same size as a data portion of the message type.

Certain implementations can provide one or more of the following advantages. For example, end-to-end communication security can permit senders and recipients communicating over an open communication network (e.g., CAN bus) to verify the identity of the sender and recipient and to establish/maintain synchronization for shared secrets (e.g., communication counter, symmetric keys), which can thwart spoofing attempts. In another example, robust end-to-end communication security with the ability to establish and maintain synchronization between controllers can permit communication between controller pairs to be encoded and obfuscated from view of other controllers on the communication network, which can thwart eavesdropping. In another example, providing robust and secure techniques for controllers to establish and maintain synchronization for shared secrets, such as counter values and shared secrets, which can be established using previously exchanged public keys, can permit controllers to dynamically and continually maintain secure channels of communication in spite of circumstances that may otherwise break channels of secure communication, such as messages being lost or arriving out of order over a communication network.

In another example, robust end-to-end communication security with the ability to establish and maintain synchronization between controllers can minimize traffic overhead since communication buses can be already overloaded. For example, some communication networks may have low latency requirements that may be frustrated by controllers clogging the network with additional information that is transmitted with network communications to permit establishing and maintaining synchronization among the controllers, such as adding additional fields to the network traffic. Robust end-to-end communication security with the ability to establish and maintain synchronization between controllers can provide secure communication and authentication of network traffic among controllers without adding to the network traffic, which can help networks to implement robust network security while still meeting any minimum performance thresholds for the network. For example, robust end-to-end communication with the ability to establish and maintain synchronization between controllers can prevent attack vectors where a malicious controller is connected to the network, is impersonating as a legitimate controller by using its arbitration/message ID's to inject malicious messages into the bus, and attempting to interfere with the normal system behavior, even when synchronization is lost between legitimate controllers using the arbitration/message ID's.

Additional and/or alternative advantages are also possible, as described below.

BRIEF DESCRIPTION OF THE ATTACHMENTS

Like reference numbers and designations in the various drawings indicate like elements.

DETAILED DESCRIPTION

This document generally describes techniques, systems, devices, and program products to provide robust end-to-end communication security that is capable of establishing and maintaining synchronization among devices/controllers that are communicating with each other through the use of shared secrets, such as symmetric keys, message counters, and/or other shared secret values. For example, a key management process can run continuously on controllers in an IoT device and can include dynamic re-issuing of short-lived session keys that are independent yet synchronized between sender and receiver, and are reset at irregular intervals. Additionally, during runtime processing, the only information that a group of controllers (e.g., ECUs) needs to have in order for each controller to remain in sync with the other controllers in the group is a common maximum threshold value for a session length for each given message type. When that threshold is reached for a message type, each controller can reset its message counter for that message type and recalculate its session key independently, with no need for communication with other controllers, resulting in a zero-overhead approach.

Controllers communicating using the key-session approach can remain in sync without the need to exchange extra data. For example, each controller can maintain the cryptographic information it needs to authenticate messages of various types of messages. Session key information can be refreshed at an appropriate rate, e.g., often enough to add an extra layer of security but not so frequently as to cause latency.

As described in more detail below, each controller can maintain shared secrets, such as a message counter and a cryptographic key (e.g., symmetric key), for each of the message types it sends or receives. Such shared secrets (e.g., the counters and the keys) are used in cryptography processes, and are reset at intervals that may be predefined, for example, at the factory level. For instance, each message type can have a customized interval (key-session) length to fit the needs of the particular message type involved.

Every received message can be decoded, and a comparison can be made between expected validation data and received data. Any mismatch detected by the recipient controller can trigger the recipient to generate an incident alert that is sent to the sender controller, and can result in immediate reset of key-session counters in order to protect against further malicious activity.

Figure 1A:
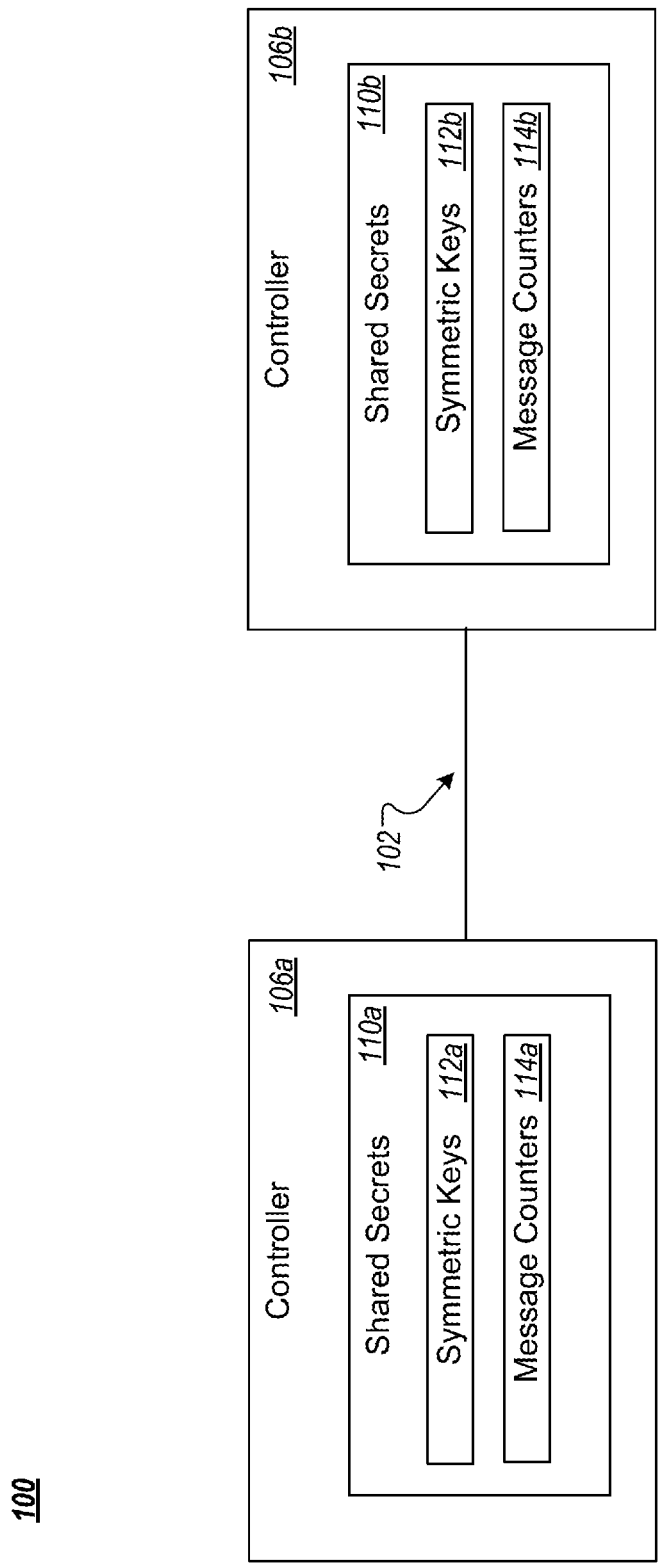
FIG. 1A is a diagram of an example system for providing robust end-to-end communication security that is able to establish and maintain synchronization of shared secrets between example controllers that communicate over an example network.

FIG. 1A is a diagram of an example system 100 for providing robust end-to-end communication security that is able to establish and maintain synchronization of shared secrets 110a-b between example controllers 106a-b that communicate over an example network 102. As depicted in this example the shared secrets include symmetric keys 112a-b and message counters 114a-b, which may have synchronized values across the controllers 106a-b in order for the controller 106a-b to communicate securely and to authenticate each other's communication over the network 102. The example system 100 can be implemented in any of a variety of contexts. For example, the controllers 106a-b can be part of the same device and/or part of separate devices. The system 100 can be implemented, for example, in a variety of different IoT devices and systems, and/or in non-IoT devices and systems. The network 102 can be any type of communications network, such as the internet, local area networks (LANs), wide area networks (WANs), wired network, wireless networks, and/or combinations thereof.

Figure 1B:
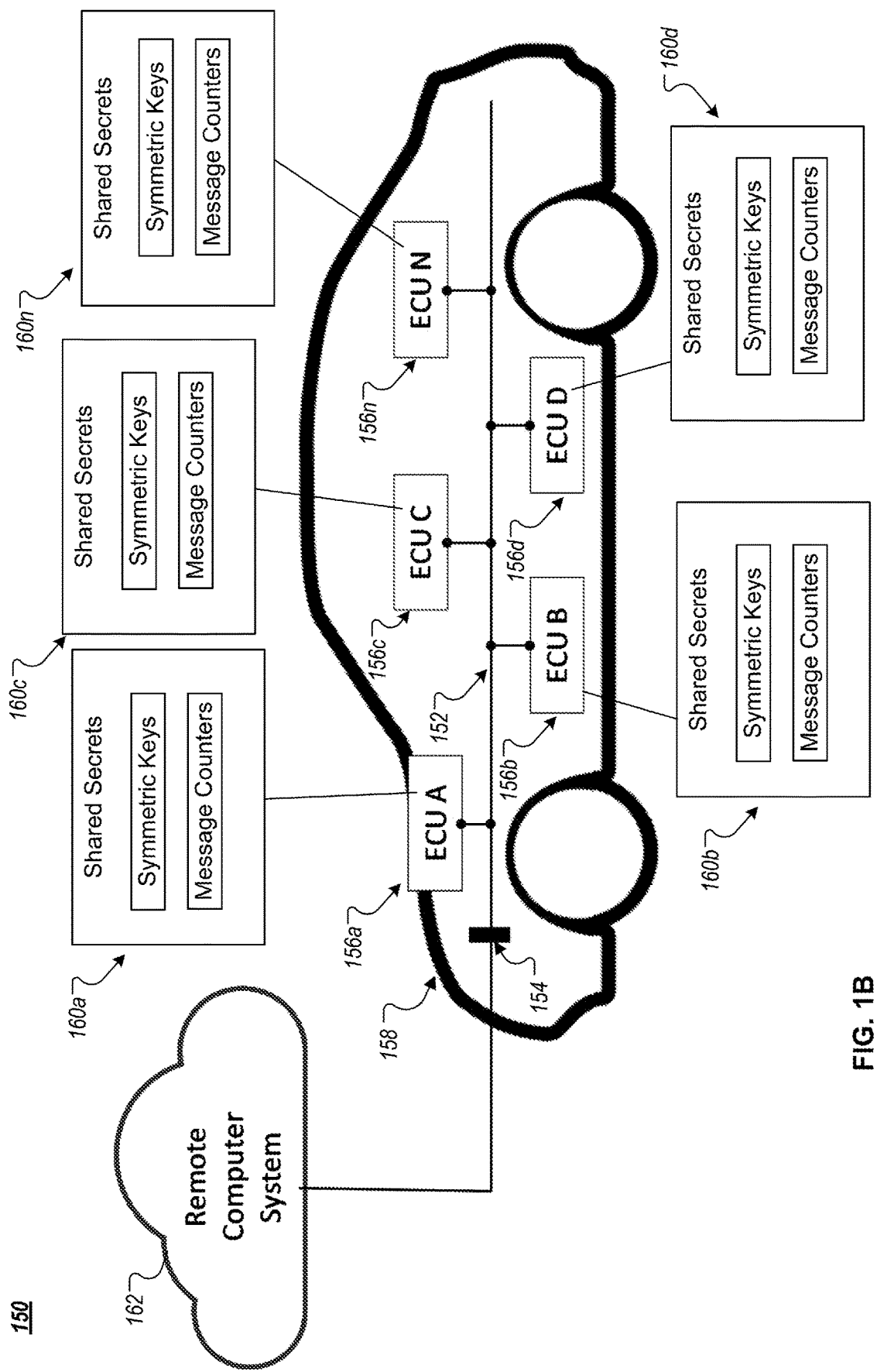
FIG. 1B is a conceptual diagram of an example system providing robust end-to-end communication security that is able to establish and maintain synchronization of shared secrets between example ECUs that are part of an IoT device.

FIG. 1B is a conceptual diagram of an example system 150 providing robust end-to-end communication security that is able to establish and maintain synchronization of shared secrets between example ECUs 156a-n that are part of an IoT device 158, which in this example is a vehicle. The example system 150 is an example of the system 100 implemented in a specific IoT context (vehicle). However, the system 150 can be implemented in a variety of other IoT devices and systems, such as security systems, smart home systems, and others.

In the example systems 100 and 150, the controllers 106a-b and the ECUs 156a-n are depicted as being communicatively connected to each other via communication networks 102 and 152. The example communications network 152 in the depicted example is a CAN bus within the vehicle 158. The system 150 can be implemented with other communication networks, as well, and in other IoT devices, as shown in system 100. Messages between the controllers 106a-b are transmitted over the network 102, and messages between the ECUs 156a-n are broadcast over the CAN bus 152 with message identifiers. The controllers 106a-b may either transmit messages that are addressed to each other, or transmit messages with particular message identifiers that each of the controllers 106a-b are configured to transmit/listen for. Each of the ECUs 156a-n are configured to transmit and listen for particular message identifiers broadcast over the CAN bus 152. If the content of the network messages are unencoded, then other devices on the network 102 (not depicted) and/or others of the ECUs 156a-n can read the contents of the messages. Furthermore, without any sort of communication security that can be used to authenticate the sender of a message as authentic, other devices on the network 102 and/or others of the ECUs 156a-n can spoof messages over the network 102 and/or CAN bus 152 by manipulating the sender field and/or the message identifier field (e.g., manipulating the message identifier field to be something that other than what the ECU is authorized to transmit). For example, a controller may spoof the sender identity in a message header for a message transmitted over the network 102. In another example, an ECU that is configured to transmit message types A and B over the network and that has been compromised by a malicious code, may spoof other message types by transmitting messages of types C, D, and E over the CAN bus 152, which can then permit the ECU to control operation of the other ECUs and compromise the security of some if not all of the ECUs A-N 156a-n. Thus, without end-to-end communication security, the messages over the network 102 and/or the CAN bus 152 are susceptible security threats, such as spoofing and eavesdropping.

Using the end-to-end communication security layers, each of the controllers 106a-b and each of the ECUs 156a-n is programmed to establish shared secrets 110a-b and 160a-n that are used to securely communicate with other controllers and ECUs through message authentication and obfuscation. The shared secrets 110a-b and 160a-n can be values that are shared, for example, between the controllers 106a-b and/or across groups of ECUs that transmit/listen for messages of the same message type. Additionally and/or alternatively, shared secrets 110a-b and 160a-n can be based on controller/ECU pairs, with each controller/ECU pair including a set of shared secrets. The shared secrets 110a-b and 160a-n can include, for example, symmetric keys 112a-b and message counters 114a-b (and/or other values) that are used to obfuscate message content and to authenticate the message as having been transmitted by an authorized controller/ECU for particular message type. The shared secrets 110a-b and 160a-n can be temporary values that are not persistently stored by the controllers 106a-b and the ECUs 156a-n, and can instead be dynamically generated, for example, when the controllers 106a-b and the ECUs 156a-n boot and/or are loaded. The shared secrets 110a-b and 160a-b may be used for purposes other than to obfuscate the content of messages transmitted over the network 102 and/or bus 152, such as being values that are used to sign messages transmitted over the network 102 and/or the bus 152 so as to authenticate the sender of the message. The shared secrets 110a-b and 160a-n, for example, can be generated based on other values that are persistently stored by the controllers 106a-b and ECUs 156a-n, such as being generated from public keys of the other controllers/ECUs that are be stored locally in communication tables that are created in secure environments and stored by the controllers/ECUs. The shared secrets 110a-b 160a-n can additionally be generated using other values that can be consistently generated by the controllers/ECUs, but which would be unreproducible/obfuscated from any sort of malicious code that may take root on the controllers/ECUs, such as unique values derived from physically unclonable functions (PUFs) on the controllers/ECUs.

The symmetric keys can be established between the controllers 106a-b and ECUs 156a-n in any of a variety of ways, such as through public key cryptography or other techniques for two parties to create a shared secret through publicly distributed information. The controllers/ECUs additionally establish a message counter (or other data value that iteratively changes in predictable ways) that is shared among the controllers/ECUs for a particular message identifier, and that is used to obfuscate message contents and to authenticate the sender of messages transmitted with the message identifier. The message counter can be changed for each message that is transmitted using the message identifier and can be used in combination with the symmetric key to obfuscate and authenticate messages. For example, the message counter can be incremented for each message of a particular message type that is transmitted. As a result, if one or more messages are either not received or are delivered out of sequence across the network 102 and CAN bus 152, then the controllers/ECUs can fall out of synch with regard to their shared secrets 110a-b and 160a-n, in particular the message counters, which can cause the controllers/ECUs to be unable to securely communicate and authenticate communication with each other. As described in greater detail below, this document describes techniques for a group of controllers/ECUs to establish and maintain synchronization of their shared secrets without transmitting the shared secrets (or other information that could expose the shared secrets to a third party no part of the authorized group) across the network 102 and/or CAN bus 152.

The example system 150 is also depicted as including a gateway 154 between the CAN bus 152 and one or more remote computer systems 162 (management computer system), which can communicate remotely with the ECUs 156a-n for any of a variety of purposes.

Figure 2:
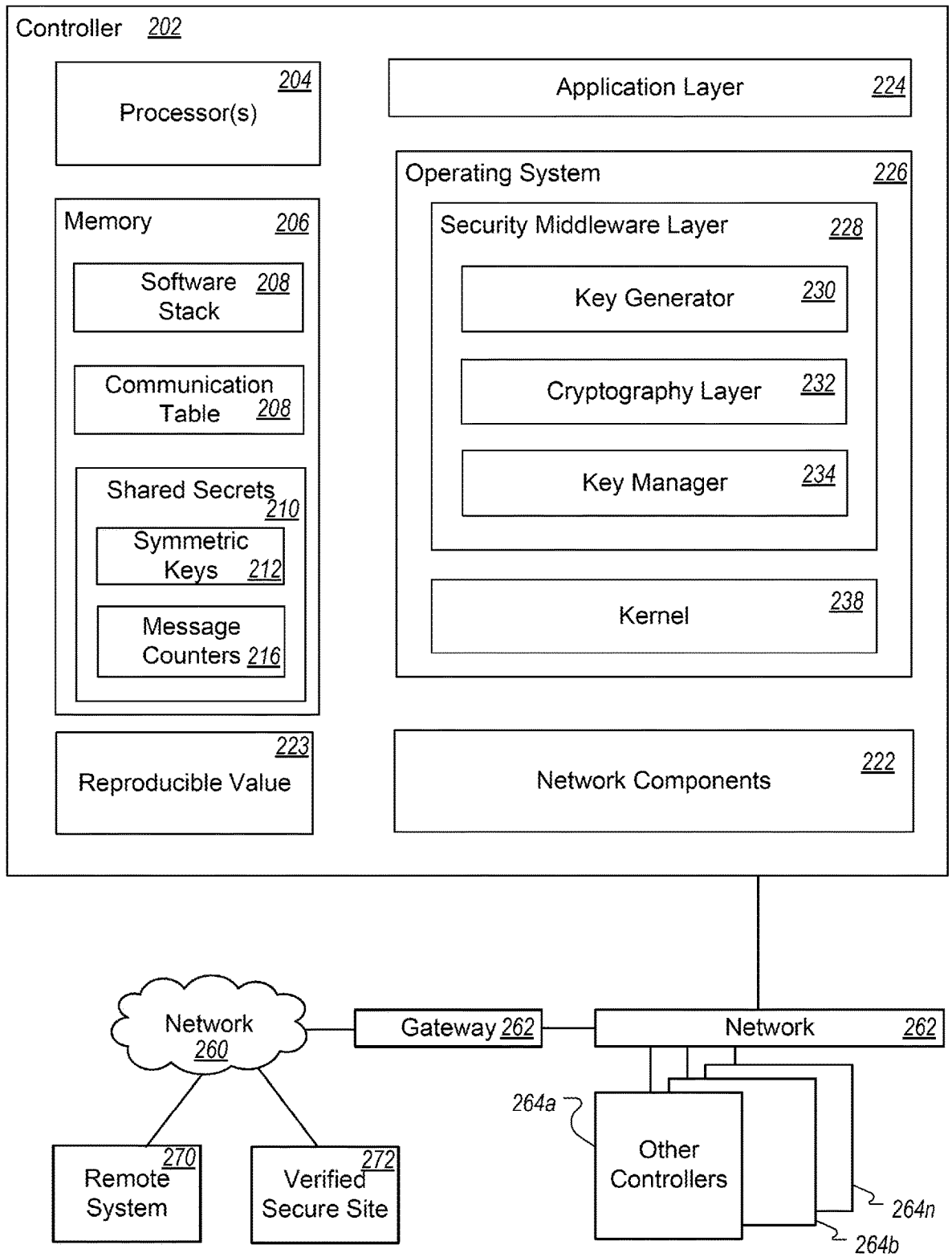
FIG. 2 is a diagram of an example system for providing end-to-end communication security on controllers.

FIG. 2 is a diagram of an example system 200 for providing robust end-to-end communication security that are capable of establishing and maintaining shared secrets on controllers. The example system 200 includes a controller 202 that can be similar to the controllers 106a-b described above with regard to FIG. 1A and/or the ECUs 156a-n described above with regard to FIG. 1B. The system 200 also includes a network 262 (e.g., CAN bus, other network) that connects the controller 202 to other controllers 264a-n, which are similar to the controller 202.

The controller 202 includes an application layer 224 at which one or more applications operate on the controller 202 through use of an operating system 226 for the controller 200. The operating system 204 includes a kernel 238 and a security middleware layer 228, which can implement end-to-end communication security for communication requests transmitted from the application layer 224 to the kernel 238, such as communication requests to the other controllers 264a-n.

The kernel 238 includes processes and functions that provide an interface for the operating system 226 to perform operations on the controller 202 using hardware, which includes one or more processors 204 (e.g., CPUs), memory 206 (e.g., volatile memory, non-volatile memory, RAM), and input/output (I/O) network components 222 (e.g., wired and wireless network cards/chip sets, network interface cards (MC)). The kernel 238 includes functions/process that direct operation of the hardware, such as program loading (e.g., functions and processes to load processes into a software stack 208 in memory 206 for execution by the processor(s) 204), in-memory services (e.g., functions that modify memory 206, functions to allocate information into and out of memory 206), networking services (e.g., processes to open network sockets and to transmit/receive network packets), and peripheral device processes (e.g., processes to interface with peripheral devices).

Symmetric keys, which are used as part of the management of cryptographic keys and other shared secrets described throughout this document, can be generated by controllers in any of a variety of ways. For example, the security middleware layer 228 includes a key generator 230 that is programmed to generate symmetric keys with the other controllers 264a-n using public information from the other controllers 264a-n (e.g., public keys provided by the other controllers 264a-n) and private information for the controller 202 (e.g., private keys generated by the controller 202 along with a corresponding public key that is shared with the other controllers 264a-n). The public and private key pairs for the controller 202 can be generated using one or more reproducible values 223 on the controller 202. Public keys can be exchanged between the controller 202 and the other controllers 264a-n, for example, when the controller 202 has received an indication that the controller 202 is operating within a known-safe environment, such as in a manufacturer or authorized servicer's facility. For instance, the key generator 230 can look for verification from the remote system 270 (e.g., remote computer system 162) that the controller 202 is within a secure environment before it is able to exchange keys among the controller 202 and the other controllers 264a-n. The remote system 270 may rely on a verified secure site 272 to identify that the controller 202 (and/or a device/system within which the controller 202 is operating) is located within its facility, before issuing authorization to the key generator 230 to perform key exchange operations.

In a further example of creating symmetric keys that are managed as part of the processes and systems described throughout this document, the key generator 230 can maintain public keys for the other controller 264a-n in a communication table 208 that is stored in memory 206 (stored in non-volatile memory), which can then be used by the key generator 230 to generate symmetric keys (from the stored public keys for the other controllers 264a-n and the private key for the controller 202) for secure communication and authentication over the network 262. The private key for the controller 202 may not be persistently stored by the controller, and may instead generate the private key for the controller 202 on demand suing the reproducible value 223, such as generating the private key when the controller 202 boots/loads. The key generator 230 can store symmetric keys 212 that are generated in volatile memory as part of the shared secrets 210 that are shared among the controller 202 and the other controllers 264a-n.

Once the symmetric keys 212 has been generated, an cryptography layer 232 that is part of the security middleware layer 228 can use the symmetric keys 212 during runtime for a variety of purposes, such as to obfuscate and authenticate communication with the other controllers 264a-n, and/or to sign communication. The encoding and decoding can be performed by the cryptography layer 232 in ways that provide security with minimal performance impact on the controller 202 and on the network 262 (e.g., providing cryptography with no or low overhead). For example, encoded messages can be transmitted over the network 262 without requiring any additional message headers or other fields that would additionally increase the message size and/or potentially alter the communication protocol.

The security middleware layer 228 can additionally include a key manager 234 that is configured to manage the shared secrets 210 on the controller 202 to ensure that they are synchronized with the shared secrets stored and used by the other controllers 264a-n. An additional shared secret 210 that can be generated, used, and managed by the key manager 234 are message counters 216 that are used in combination with the symmetric keys 212 to vary the values used to ultimately obfuscate and decipher messages, and that are used to authenticate message senders. Like symmetric keys 212, message counters 216 can be shared secrets among the controller 202 and the other controllers 264a-n. The key manager 234 can use any of a variety of appropriate processes, such as those described below, to establish and maintain synchronization of the shared secrets 210 among the controller 202 and the other controllers 264a-n.

The controller 202, the network 262, and the other controllers 264a-n can be part of a common device and/or system, such as the vehicle 158, and/or they can be part of separate devices and/or systems, such as being part of a smart home system. The network 262 can be connected to a gateway 262 that provides access to one or more networks 260 (e.g., internet, WAN, LAN, wireless network, mobile data network, cellular network, combinations thereof) outside of such a common device and/or system.

Figure 3:
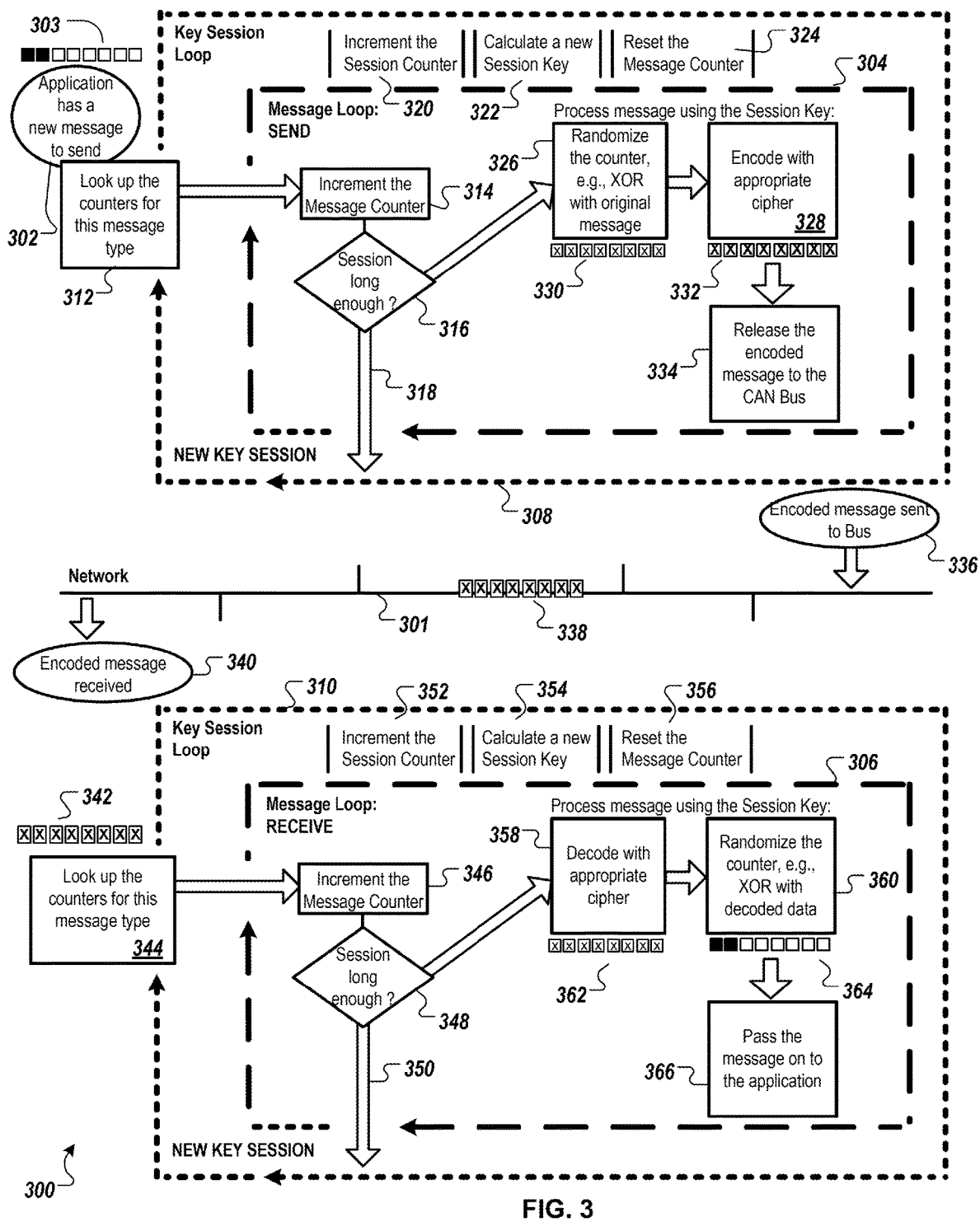
FIG. 3 illustrates an example process for sending and receiving a message on a CAN bus.

FIG. 3 illustrates an example process 300 for sending and receiving a message on a network 301, such as a CAN bus. The example process 300 can be used across other network. The example process 300 is depicted as being performed by ECUs, but can additionally and/or alternatively be performed by other types of controllers As illustrated in FIG. 3, for each particular message type in the network 301, a process occurs for the sending and receiving of messages of the message type. As indicated by a note 302, an application running on a sending ECU has a new message 303 to send to a receiving ECU.

Processing of the message 303 can include a message cycle, illustrated as an inner message-send loop 304 performed by the sending ECU and an inner message-receive loop 306 performed by the receiving ECU. Each inner loop 304 or 306 corresponds to a series of messages in a single key session, in which each message in the key session is encoded/decoded using a same session key $k^i\_X$, and in which a message counter $c\_X$ is incremented for each message transmission. When the value of $c\_X$ reaches a predetermined threshold value, a new key session begins, and the message counter $c\_X$ is reset.

Processing of the message 303 can include a key-session cycle, illustrated as an outer key session loop 308 performed by the sending ECU and an outer key session loop 310 performed by the receiving ECU. Each key session loop 308 or 310 corresponds to key sessions of a particular message type during operation of the network 301. A new session key is calculated each time the predefined maximum session length is reached for a particular message type. A key-session counter $c'\_X$ is incremented each time a new session starts, and is used (in combination with a master key k_X) in the calculation of a new session key k'_X.

In further detail, at a processing step 312, in response to determining that the message 303 is to be sent, the sending ECU looks up counters (e.g., a message counter, a session counter) for the message type of the message 303. The message counter for the message type is incremented, at step 314. At step 316, the sending ECU determines whether the current session for the message type has reached a maximum session length (e.g., whether max_X messages of the message type have been sent or received by the sending ECU). If the current session for the message type has reached the maximum session length for the message type (e.g., as illustrated by an arrow 318), the key session loop 308 is executed to create a new key session for the message type. For example, at step 320, a session counter for the message type is incremented. At step 322, a new session key for the message type is calculated. At step 324, the message counter for the message type is reset.

At steps 326 and 328, the sending ECU processes the message 303 using the current session key for the message type of the message 303. Steps 326 and 328 can be performed after step 324 (e.g., after the key session loop 308 is executed), or after step 316, if the current session for the message type had not yet reached the maximum session length. At step 326, the message counter for the message type is randomized, such as by performing an operation (e.g., XOR) with the message 303, to create an intermediate message 330. At step 328, the intermediate message 330 is encoded with an appropriate cipher, to create an encoded message 332. The encoded message 332 is released, and sent to the network 301 (e.g., CAN bus), as illustrated by notes 334 and 336 and a sent encoded message 338.

The sent encoded message 338 is received by the receiving ECU, as illustrated by a note 340 and a received encoded message 342. In response to receiving the received encoded message 342, the receiving ECU, at step 344, looks up counters (e.g., a message counter and a session counter) for the message type of the received encoded message 342.

The receiving ECU can perform similar processing as the sending ECU, to determine whether to create a new session for the message type. For example, the message counter for the message type is incremented by the receiving ECU, at step 346. At step 348, the receiving ECU determines whether the current session for the message type has reached a maximum session length for the message type. If the current session for the message type has reached the maximum session length for the message type (e.g., as illustrated by an arrow 350), the outer key session loop 310 is executed to create a new key session for the message type for the receiving ECU. For example, at step 352, a session counter for the message type is incremented. At step 354, a new session key for the message type is calculated. At step 356, the message counter for the message type is reset.

At steps 358 and 360, the receiving ECU processes the received encoded message or MAC 342 using the current session key for the message type of the received encoded message 342. Steps 358 and 360 can be performed after step 356 (e.g., after the key session loop 310 is executed) or after step 348, if the current session for the message type had not yet reached the maximum session length for the message type.

At step 358, the received encoded message 342 is decoded with an appropriate cipher, to create a decoded intermediate message 362. At step 360, the message counter for the message type is randomized, such as by performing an operation (e.g., XOR) with the decoded intermediate message 362, to create a received message 364. The received message 364 matches the message 303. The received message 364 is passed to an application running on the receiving ECU, at step 366. Additionally and/or alternatively, in the case of the MAC the received message 364 can be passed to a validation function, which can validate it against the clear text. With in-place cryptography and authentication, the validation can be performed against data redundancy in the message.

Figure 4:
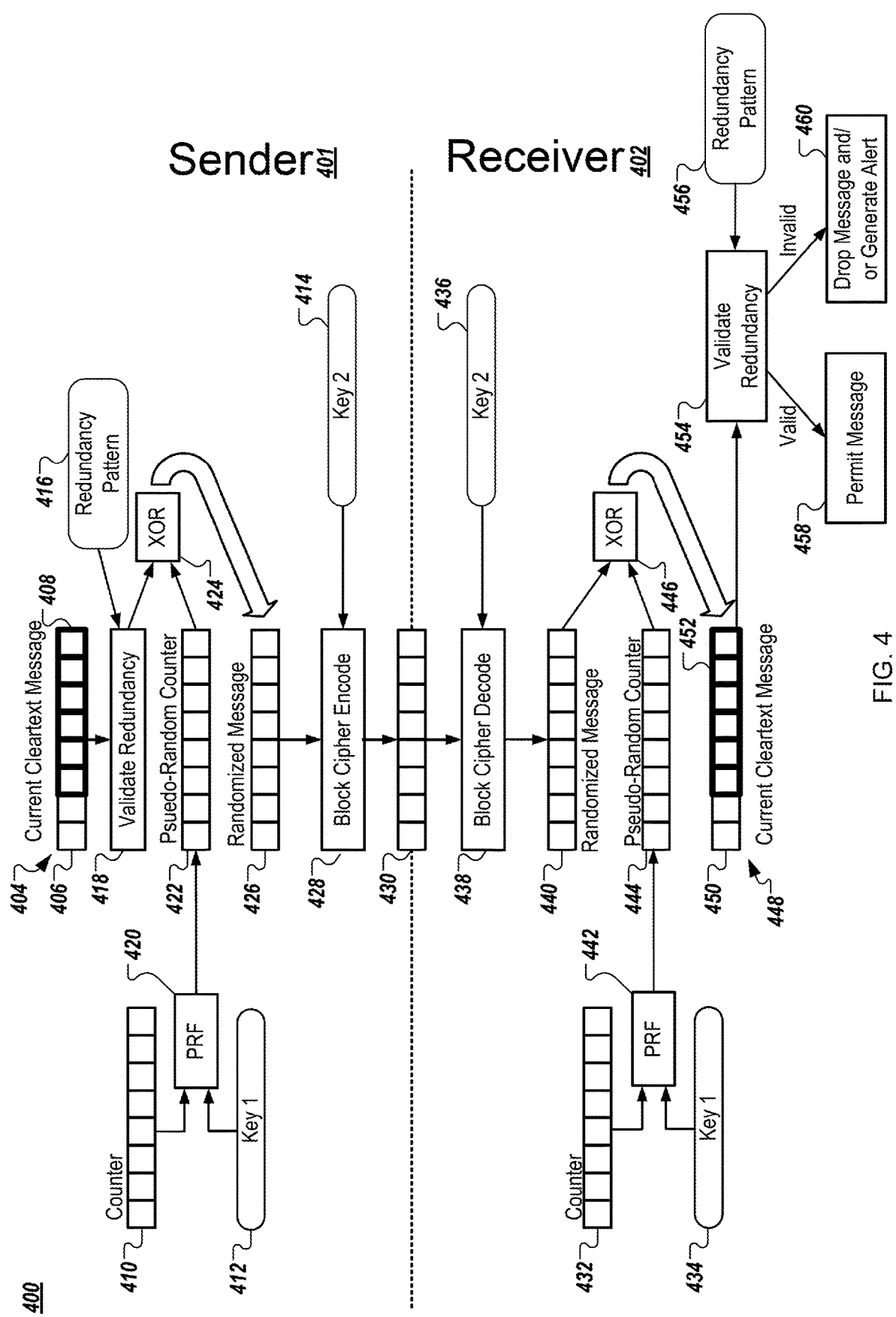
FIG. 4 illustrates an example system for sending a message from a sending controller to a receiving controller.

FIG. 4 illustrates an example system 400 for sending a message from a sending controller 401 to a receiving controller 402. The controllers 401-402 can be any of a variety of controllers, such as the controllers 106a-b described above with regard to FIG. 1A, the ECUs 156a-n described above with regard to FIG. 1B, the controller 202 described above with regard to FIG. 2, and/or the ECUs described above with regard to FIG. 3. FIG. 4 depicts an example encoding and authentication process that uses synchronized shared secrets among the sender controller 401 and the receiver controller 402, which in this example includes synchronized counters 410 and 432, synchronized keys 414 and 436, and other synchronized keys 412 and 434. Synchronization can be used for other processes, as well.

In the depicted example, the sending controller 401 generates a cleartext message 404 that include non-redundant data 406 and redundant data 408. The redundant data 408 refers to the patterns of data for each specific type of message, which include only be a subset of all possible strings (of same length). A particular type of redundancy for a message type is when specific bits in the message have patterns that lend themselves to being known values. The redundant data 408, which are the predictable or expected portions of the cleartext message 404, can be some or all of the cleartext message 404. The redundant data 408 can include values that, based on the message id for the message 404 (or other information identifying a type of message or pattern contained within the message), are predictable/expected, which can be used by the receiver 402 to authenticate the message 404 without requiring the addition of any authentication bits (e.g., CRC code, hash values) to or other modifications of message 404. The predicted or expected value for the redundant data 408 in the message 404 can be evaluated against the actual value of the redundant data 408 to validate the redundancy in the message (418), which can be performed by the sender 401 of the message 404 (to ensure that the message 404 includes redundant data 408 that can be validated by the recipient 402) before sending the message 404. For example, redundancy patterns 416, which can be part of a model for the message id, can be pregenerated through dynamic and static analysis of the ECU and network behavior, and can define expected values (e.g., static values, dynamically changing values, permissible ranges of values) in the redundant data 408 for message of a corresponding type. Such redundancy patterns 416 can be loaded onto the sender 401 and recipient 402, and used to identify an expected value and/or a range of expected values for the redundant data 408.

Both the sender 401 and recipient 402 (as well as other controllers transmitting and/or listening to the type of the message 404) can maintain counters 410 and 432 that are synchronized for the type of message 404. The counters 410 and 432 can simply be incremented (or otherwise changed in predetermined ways) as messages of the type for the message 404 are transmitted over the network (e.g., CAN bus). Both the sender 401 and the recipient 402 can also both maintain keys 412 and 434, and keys 414 and 436 that are synchronized. The synchronization of these (and/or other)

shared secrets can be used by the sender 401 and the receiver 402 to effectively encode/decode and authenticate messages. As described in greater detail throughout this document, the sender 401 and recipient 402 can use various techniques to identify when these shared secrets are out of synch, and also to reestablish synchronization of these values.

As depicted in FIG. 4, the counter 410 can be transformed into a pseudo-random counter 422 through the use of a first key 412 that is combined with the counter 410 using a pseudorandom function (PRF) 420. The first key 412 can be a shared secret between the sender 401 and recipient 402 controllers, such as a symmetric key value (or other type of key) that is securely stored/reproducible by both the sender and recipient. Any of a variety of PRFs can be used as the PRF 420, such as a block cipher, a look-up table, and/or other type of PRF.

Once the redundancy of the cleartext message 404 (which includes the non-redundant data 406 and the redundant data 408) has been validated (418), the cleartext message 404 and the pseudo-random counter 422 can be combined (424) to create a randomized message 426. For example, the cleartext message 404 and the pseudo-random counter 422 can be combined using an XOR operation 424.

The randomized message 426 can be subject to a block cipher encoding process 428, which can use a key 414 to encode the randomized message 426, to create a ciphertext 430. The key 414 can be a shared secret between the sender and recipient controllers, similar to the key 412. Other encoding processes different from block ciphers may additionally and/or alternatively be used. The ciphertext 430 may then, once created, be passed from one controller to another over a network, such as CAN bus.

As shown, the recipient 402 can perform the same operations of the sender 401, but in reverse order to turn to the ciphertext 430 into the cleartext message 448, including performing a block cipher decoding 438 of the ciphertext 430 to generate the randomized message 440, generating the pseudo-random counter 444 and combining it via an XOR operation 446 with the randomized message 440 to obtain the cleartext message 448. The recipient 402 also validates (454) the predictable data 452 before accepting the cleartext message 448 through the use of redundancy patterns 456 for the message type to determine expected values for the redundant data 452. If the expected value matches the actual redundant data 452 in the decoded message 448, then the message 448 can be validated as originating from an authentic source (as opposed to another source spoofing the identity of the sender) and permit the controller to use the message 448 (458). In contrast, if the expected value does not match the actual redundant data 452 in the decoded message, then the message can be dropped by the controller and/or an alert can be generated (460). Such an alert can indicate any of a variety of problems that may exist, such as the recipient 402 falling out of sync with the sender 401 with regard to their shared counter values 410 and 432, and/or with regard to the other shared secrets (key 412/434, key 414/436). Techniques for reestablishing synchronization between the sender 401 and the recipient 402 are described in greater detail below.

Figure 5A:
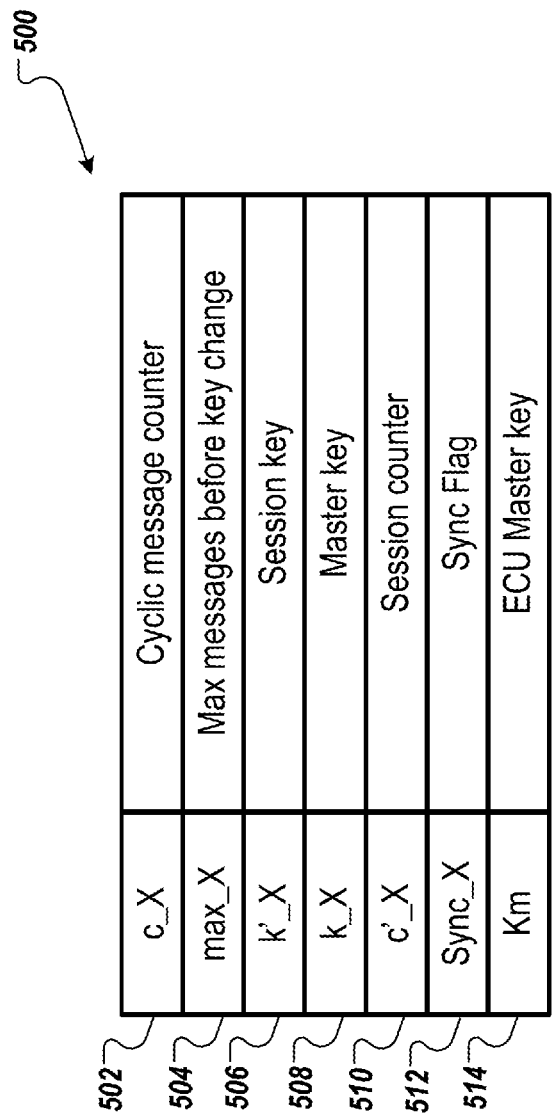
FIG. 5A is a table that describes various data items used for key management.

FIG. 5A is a table 500 that describes various data items used for key management. The example table 500 is described with regard to ECUs, but can additionally and/or alternatively be used with other types of controllers and across various types of networks. A cyclic message counter c_X 502 represents a current count of authenticated messages of type "x" in a block of messages during a key session. The cyclic message counter c_X 502 can be incremented upon message transmission and can have a value from zero to a maximum message count max_X 504. The maximum message count max_X 504 represents a maximum number of messages of type "x" that can be sent before a session key k'_X 506 is changed to start a new session. The cyclic message counter c_X 504 is reset at the beginning of each session after the maximum message count max_X 504 is reached. The maximum message count max_X 504 can be set to a predefined default value for some or all message types, and can be set to a value that is lower than the predefined default value for message types that determined to be more sensitive than other message types, for greater security for messages of the sensitive message types. In some implementations, the maximum message count max_X 504 is determined by an algorithm and can be used by all ECUs that send or receive messages of the message type "x".

The session key k'_X 506 is used to authenticate up to a block of max_X messages of type "x", and is then changed after a maximum message count max_X 504 messages of type "x" have been sent. A master key k_X 508 can be used to derive a new value for the session key k'_X 506. The master key k_X 508 for message type "x" can be an original factory value for the message type "x" and can be vehicle-specific.

A session counter c'_X 510 represents a number of times that the session key k'_X 506 has been changed for the message type "x". The session counter c'_X 510 can be incremented upon recalculation of the session key k'_X 506. A sync flag Sync_X 512 can be maintained for each receiver to indicate whether the receiver has been synchronized with a sender. An ECU master key Km 514 can be used to recover other keys, and can be stored in boot-only storage.

Figure 5B:
FIG. 5B is an example communications table for an example ECU.

FIG. 5B is an example communications table 550 for an example ECU. The example table 550 is described with regard to ECUs, but can additionally and/or alternatively be used with other types of controllers and across various types of networks. The communications table 550 can be encoded and stored, for example, in flash memory of the ECU. Each row in the communications table 550 represents a message type for which the ECU is either a sender or a receiver. For example, a row 552 is for a first message type that has a message type identifier 553 value of "0x25" 554 and a row 556 is for a second message type with a message type identifier value of "0x61" 557. Other rows can correspond to other message types that are relevant for the given ECU.

Each row in the communication table 550 includes a master key k_X value 558 for a respective message type. For example, the row 552 includes a master key value of "254FF891" 560 for the first message type and the row 556 includes a master key value of "25CE1195" 561 for the second message type. Master keys can be constant values that are generated using, for example, a vehicle identification number and an ECU identifier.

Each row in the communication table 550 includes a session length max_X (e.g., maximum session message count) value 562 for the corresponding message type. For example, the row 552 includes a max_X value 564 of one hundred for the first message type. The row 556 includes a max_X value 565 of twenty five for the second message type. Each session length max_X value 562 can be a constant value that is calculated based on a corresponding message type's cryptography strength and vehicle identification number. A session length max_X value 562 for a message type can be shared (e.g., have a same value) for a group of ECUs that send or receive messages of the message type.

A session key k'_X 568 is stored in the communication table 550 for every message type relevant to the given ECU. For example, a session key 569 is stored in the row 552 for the first message type and a session key 570 is stored in the row 556 for the second message type. The session keys 569 and 570 are re-calculated using a new session counter 571 after every max_X 564 or max_X 566 messages of a corresponding message type have been sent, respectively. Respective message counters c_X 572 and c_X 574 are incremented every time a message of a corresponding message type is sent. The respective message counters 572 and 574 are reset after max_X 564 or max_X 566 messages of a corresponding message type have been sent. When max_X 564 or max_X 566 message of a respective message type have been sent, a corresponding session counter c'_X 576 or c'_X 578 is incremented.

Figure 6:
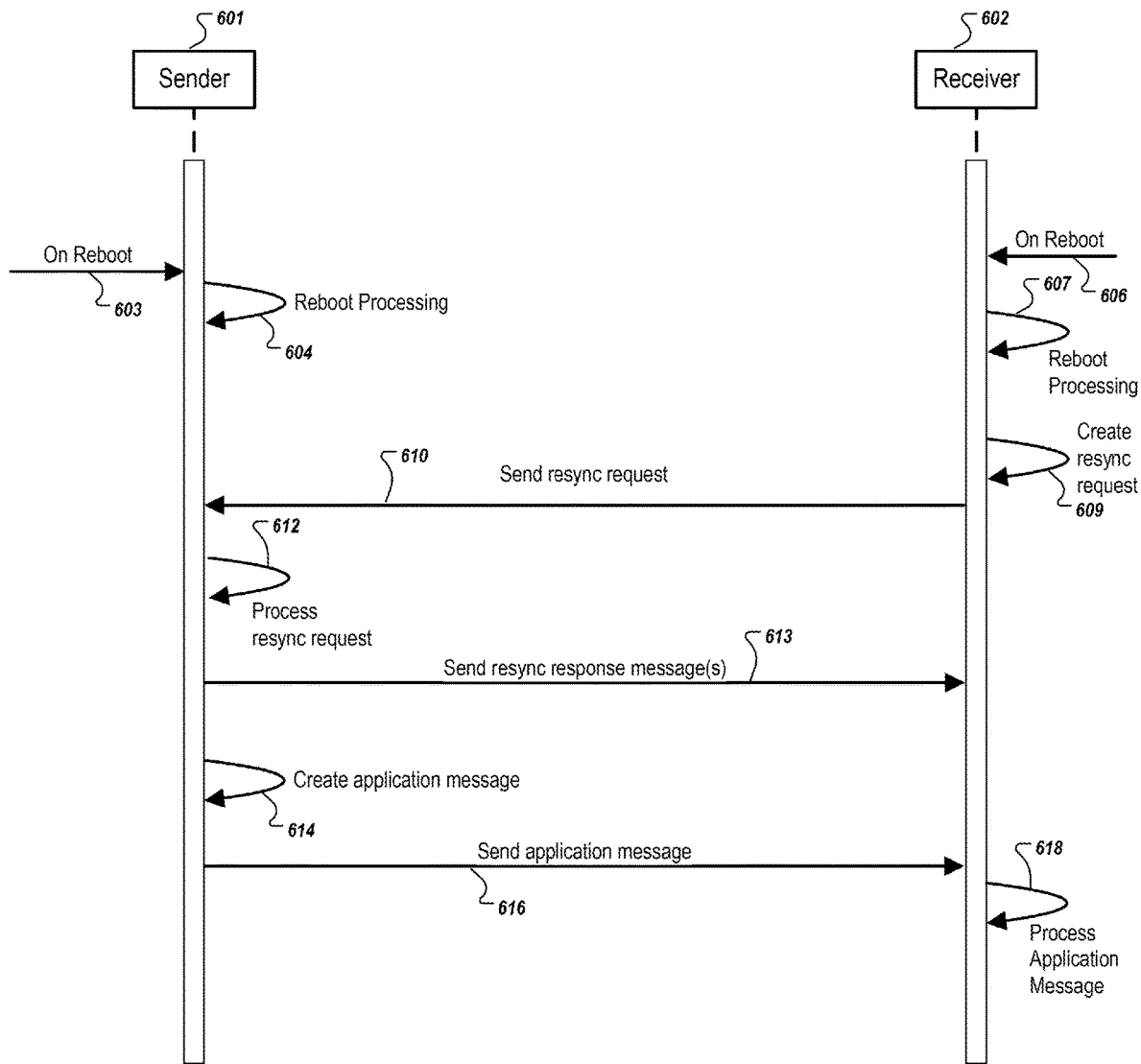
FIG. 6 is a swim lane diagram showing an overview of processing by a sender ECU and a receiver ECU.

FIG. 6 is a swim lane diagram 600 showing an overview of processing by a sender ECU (e.g., a sender 601) and a receiver ECU (e.g., a receiver 602). The example diagram 500 is depicted with regard to ECUs, but can additionally and/or alternatively be used with other types of controllers and across various types of networks. When the sender 601 is rebooted (e.g., as represented by an on-reboot event message 603), the sender 601 can perform reboot processing (604). Similarly, when the receiver 602 is rebooted (e.g., as represented by an on-reboot event message 606), the receiver 602 can perform reboot processing (607). Reboot processing is described in more detail below with respect to FIG. 7.

Figure 7:
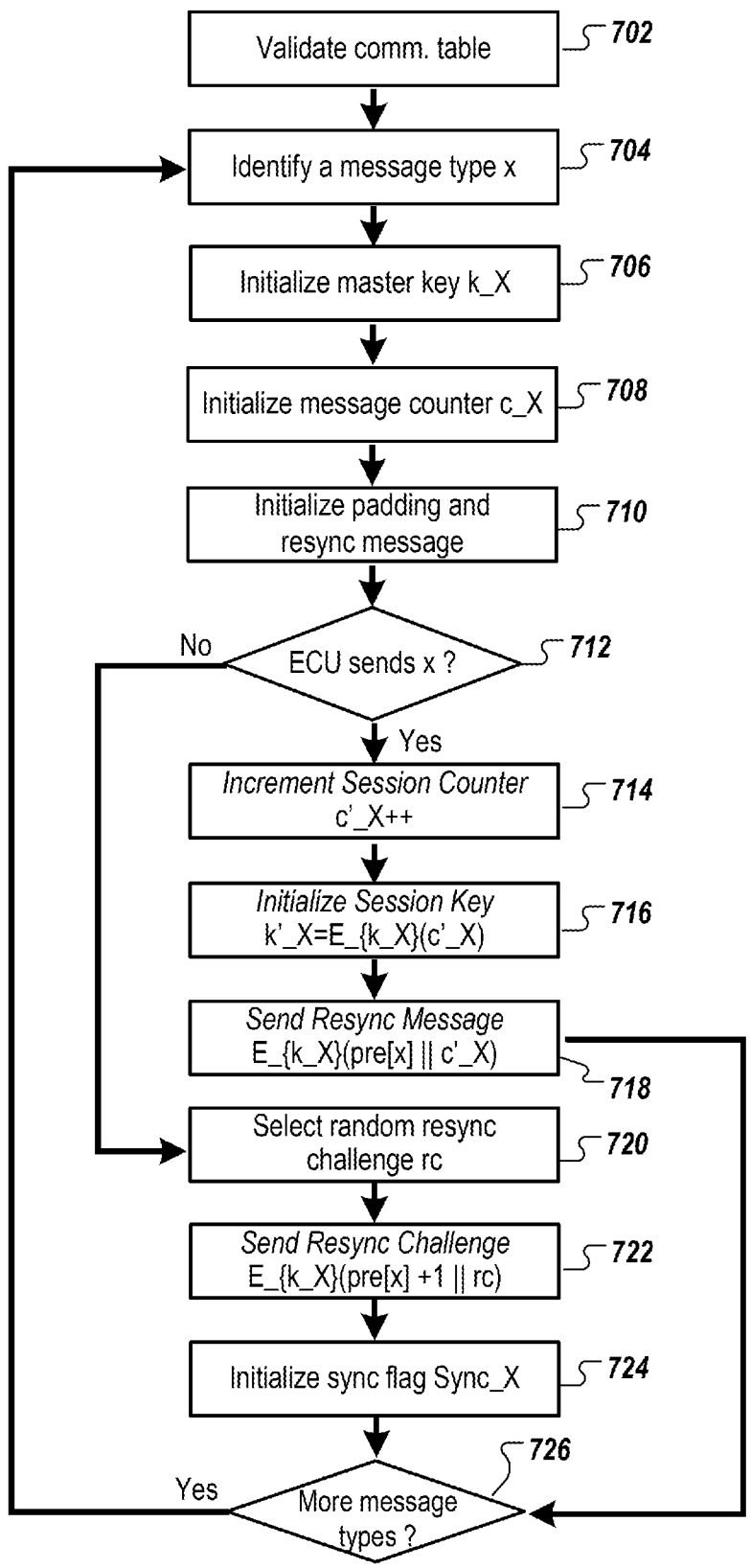
FIG. 7 is a flowchart of an example method for ECU reboot processing.

FIG. 7 is a flowchart of an example method 700 for ECU reboot processing. The example method 700 is described with regard to ECUs, but can additionally and/or alternatively be used with other types of controllers and across various types of networks. At 702, a communications table of the ECU is validated. For example, a long-term master ECU key Km can be read from boot-only storage. The long-term key can be used as input to a PRG to derive an ECU cryptography key Ke and an ECU authentication key Ka. An encoded communication table (ECT), and an ECT authenticator ECTa can be read from persistent storage.

The ECTa and the ECU authentication key Ka can be used to authenticate the ECT. If the ECT is successfully authenticated, the ECT can be decoded using the ECU encoding key Ke. If ECU authentication fails, an alert can be generated indicating that the ECT may be corrupted. In some implementations, the long-term master ECU key Km, the ECU encoding key Ke, and the ECU authentication key Ka are erased (and reread/re-generated upon a next reboot).

After successful communication table validation and decoding, processing is performed for each message type included in the decoded communications table. At 704, a first message type X included in the communications table is identified.

At 706, a master key k_X for the message type is initialized (e.g., read from the communications table in an entry corresponding to the identified message type). At 708, a message counter c_X for the message type is initialized (e.g., set to zero).

At 710, padding and a resync message are initialized. A certain amount of padding can be used in resync messages, based on the length of a given message. For example, if the length of messages of the identified message type is eight bytes, then a twenty-four bit buffer of padding can be initialized and a resync message length can be set to seven. If the length of messages of the identified message type is a value other than eight bytes, a thirty-two bit buffer of padding can be initialized and a resync message length can be set to eight. The buffer of padding can be prepended to resync messages so that resync messages can be readily identified.

At 712, a determination is made as to whether the ECU sends (or receives) messages of the identified message type. If the ECU sends messages of the identified message type, a session counter c'_X is incremented, at 714. At 716, a session key k'_X is initialized, such by executing a statement of k'_X=E_{k_X}(c'_X), which involves encoding the session counter using the master key k_X. At 718, a resync message is generated and sent, to ECUs that are receivers of the identified message type. The resync message can be an encoded message, using the master key k_X, of a result of combining the session key with the buffer of padding (e.g., using an XOR operation).

At 720, when the ECU is a receiver of the identified message type, a random resync challenge rc is generated. The three least significant bits of the resync challenge have values other than zeros, so as to not conflict with a sender-initiated resync message.

At 722, a resync challenge message is generated and sent to receivers of the identified message type. The resync challenge message can be an encoded message, using the master key, of the random resync challenge rc and an expression involving the buffer of padding (e.g., pre[x]+1). At 724, a receiver sync flag Sync_X is initialized (e.g., set to False).

At 726, a determination is made as to whether there are more message types included in the communications table. If there are more message types included in the communications table, a next message type is identified, at 704, and processing continues for the next message type.

Referring again to FIG. 6, the receiver 602 can be configured (e.g., periodically or upon detection of a condition) to generate a resync request message, at 609, for a particular message type. The resync request message can include a random challenge. The length of the resync request message can be based on the length of messages of the particular message type. For example, if messages of the particular message type are eight bytes, the resync request message can be seven bytes (e.g., to be distinguishable in length from regular messages). If the length of messages of the particular message type is other than eight bytes, the resync request message can be eight bytes. At 610, the resync request message is sent to the sender 601 (and possibly to other senders). At 612, the sender 601 processes the received resync request message. At 613, the sender 601 can send one or more resync response messages to the receiver 602. Processing a resync request is described in more detail below with respect to FIG. 8.

Figure 8:
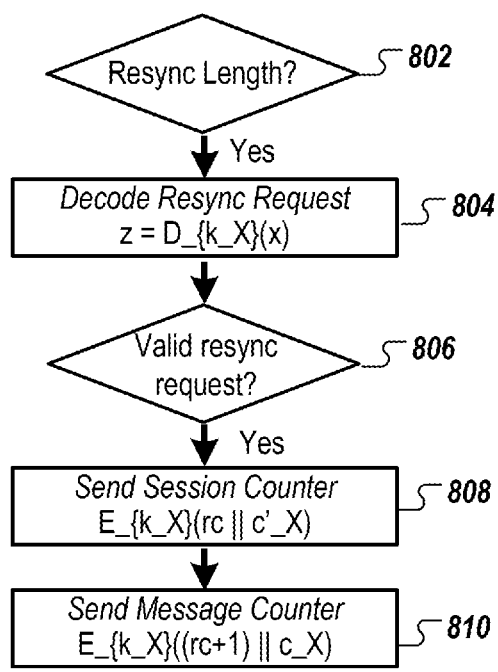
FIG. 8 is a flowchart of an example method for processing a resync request message.

FIG. 8 is a flowchart of an example method 800 for processing a resync request message. The example method 800 is described with regard to ECUs, but can additionally and/or alternatively be used with other types of controllers and across various types of networks. At 802, in response to receiving a message of a particular message type, a sending ECU determines whether the received message has a length equal to a predefined resync request message length for the message type. The length of a resync message for a message type can be different than the length of regular message of the message type, for example.

If the length of the received message matches the predefined resync request message length for the message type, the sending ECU, at 804, decodes the resync request message. For example, the resync request message can be decoded using a master key, to create a decoded resync request message.

At 806, a determination is made as to whether the decoded resync request message is a valid resync request message. For example, the sending ECU can determine whether the decoded resync request message includes a particular combination of padding and a random challenge.

If the decoded resync request message is valid, a session counter is sent, at 808. For example, a session counter c'_X for the message type can be combined (e.g., using an XOR operation) with a random challenge rc, and the combined value can be encoded using a master key for the message type and sent to the receiver ECU that sent the resync request message.

At 810, a message counter is sent to the receiver ECU. For example, a message counter c_X for the message type can be combined (e.g., using an XOR operation) with a value of rc+1, and the combined value can be encoded using the master key for the message type and sent to the receiver ECU that sent the resync request message.

Referring again to FIG. 6, at 614, the sender 601, at various points in time, can create an application message of a particular message type to send to the receiver 602. At 616, the sender 601 sends the application message to the receiver 602. Sending an application message is described in more detail below with respect to FIG. 9.

Figure 9:
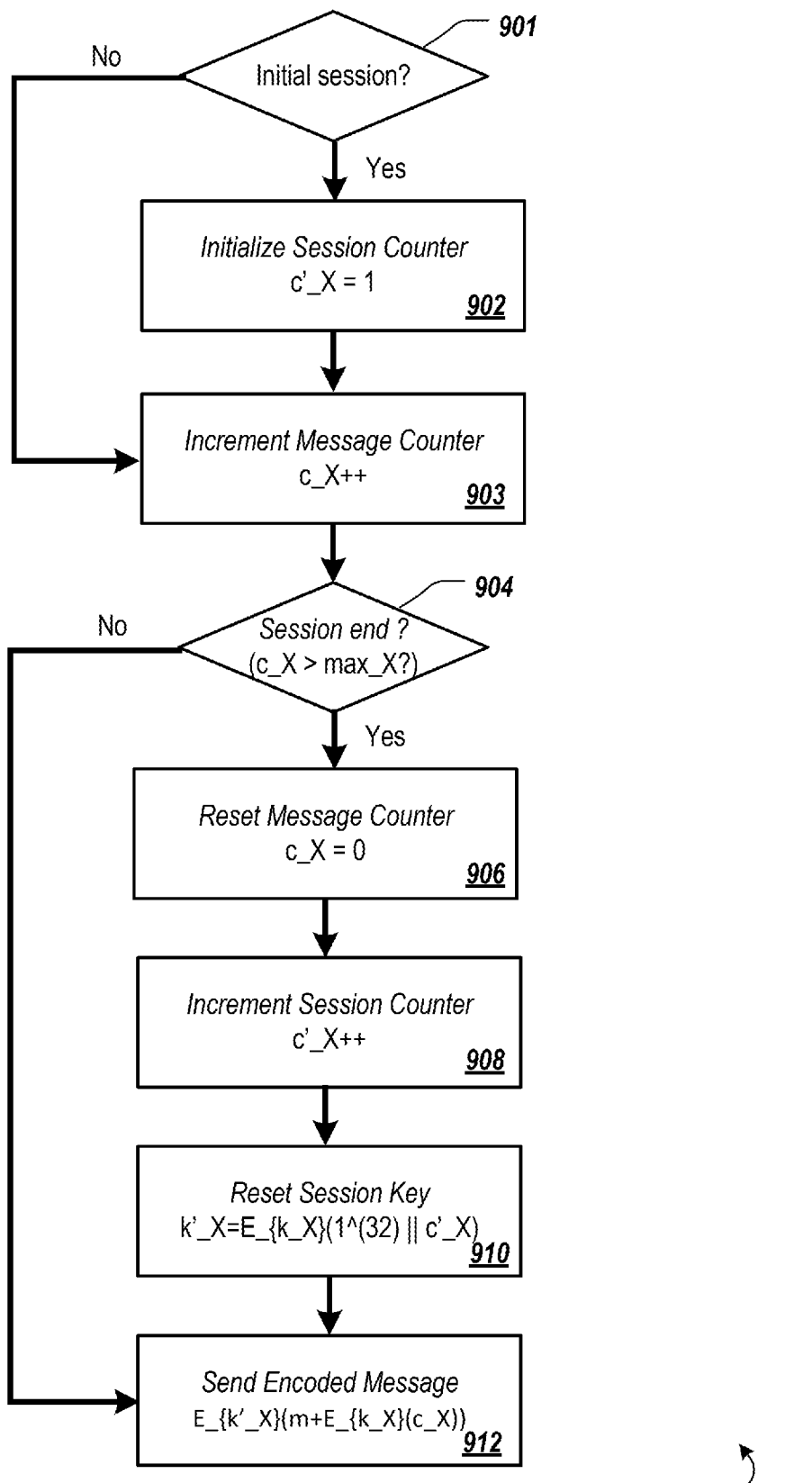
FIG. 9 is a flowchart of an example method for sending an application message of a particular message type to one or more receivers.

FIG. 9 is a flowchart of an example method 900 for sending an application message of a particular message type to one or more receivers. The example method 900 is described with regard to ECUs, but can additionally and/or alternatively be used with other types of controllers and across various types of networks. At 901, a determination is made as to whether a current session for the message type is an initial session. For example, an initialization flag (e.g., init_X) for the message type can be checked. If the current session for the message type is an initial session, at 902, a session counter c'_X for the message type can be set to one.

At 903, a cyclic message counter c_X for the message type is incremented (e.g., using a statement such as c_X++). At 904, a determination is made as to whether the current session for the message type should end. Determining whether the current session for the message type should end can include determining whether the cyclic message counter for the message type is more than a predefined maximum count. For example, the predefined maximum count can be represented as max_X. Max_X can represent a maximum number of messages before a session key for the message type is changed.

If the current session for the message type should end (e.g. if the cyclic message counter for the message type is more than the predefined maximum count), the cyclic message counter for the message type is reset, at 906 (e.g., c_X=0). After the cyclic message counter for the message type is reset, a session counter c'_X for the message type is incremented, at 908 (e.g., c'_X++). After the session counter for the message type is incremented, the session key for the message type is re-set, at 910. For example, the session key k'_X for the message type can be set to a value of E_{k_X}(1^(32)|c'_X), which is an encoding of the session counter (and padding) using the master key for the message type.

At 912 (e.g., after the session key for the message type is re-assigned, or when the cyclic message counter for the message type was not more than the predefined maximum count, at 904), the message to be sent is encoded using the current session key for the message type to create an encoded message. The encoded message is then sent to the receiver(s). For example, the message to be sent can be encoded using the statement E_{k'_X}(m+E_{k_X}(c_X)), where k'_X is the current session key for the message type, m is the message to send, k_X is the master key for the message type, and c_X is the current cyclic message counter for the message type. Using E_{k_X}(c_X) in the encoded message provides a pseudorandom mapping for c_X values, which can prevent predictability of relations between different inputs.

Referring again to FIG. 6, at 618, the receiver 602 processes the received application message. Receiving an application message is described in more detail below with respect to FIG. 10.

Although one sender 601 and receiver 602 are shown, the system can include multiple senders and multiple receivers. A given sender can also act as a receiver, and a given receiver can also act as a sender. In some implementations, the sender 601 can receive an indication (e.g., once every T messages, or after a time interval T has passed (where T is a predefined number)) to send a sync message to the receiver 602. In response to the indication, the sender 601 can create and send a sync message to the receiver 602.

Figure 10:
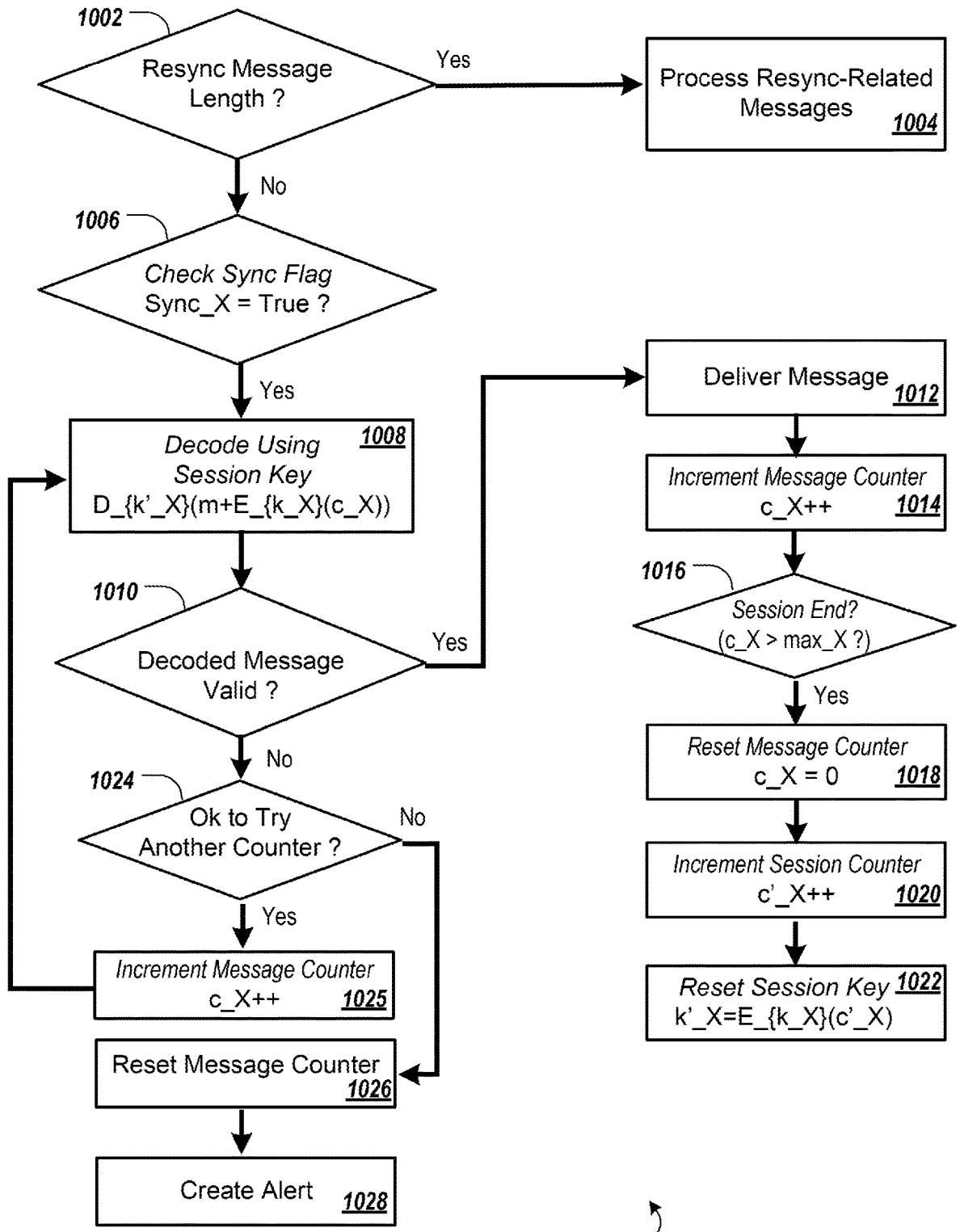
FIG. 10 is a flowchart of an example method for receiving a message by an ECU.

FIG. 10 is a flowchart of an example method 1000 for receiving a message by an ECU. The example method 1000 is described with regard to ECUs, but can additionally and/or alternatively be used with other types of controllers and across various types of networks. At 1002, a determination is made as to whether a length of a received message of a particular message type matches a resync message length for that message type. If the length of the received message of the message type matches the resync message length for the message type, the message is treated as a resync-related message and is processed, at 1004, by a process resync-related messages process. Processing resync-related messages is described below with respect to FIG. 11.

If the length of the received message of the message type does not match the resync message length for the message type, a determination is made, at 1006, as to whether a sync flag is set for the message type (e.g., whether Sync_X has a value of True). The sync flag being set for a message type can indicate that the sender and the receiver are in sync with respect to the message type.

If the sync flag for the message type is set, the received message is decoded, at 1008, using the current session key. For example, the received message can be decoded using a statement such as D_{k'_X}(m+E_{k_X}(c_X)), where k'_X is the current session key for the message type, k_X is the master key for the message type, and c_X is the message counter for the message type.

After the received message has been decoded, a determination is made, at 1010, as to whether the decoded message is valid. For example, the decoded message can be valid if it includes an expected amount of redundancy. If the decoded message is valid, the decoded message is delivered, at 1012, to a target application running in the receiving ECU. At 1014, after the message is delivered, the message counter for the message type is incremented (e.g., c_X++).

At 1016, a determination is made as to whether the current session for the message type should end. Determining whether the current session for the message type should end can include determining whether the message counter for the message type is more than a predefined maximum count max_X. If the current session for the message type should end, the message counter for the message type is reset, at 1018 (e.g., c_X=0). After the message counter for the message type is reset, a session counter c'_X for the message type is incremented, at 1020 (e.g., c'_X++). After the session counter for the message type is incremented, the session key for the message type is re-set, at 1022. For example, the session key k'_X for the message type can be set to a value of E_{k_X}(c'_X), which is an encoding of the session counter using the master key for the message type.

If, at 1010, the decoded message is invalid, a determination is made, at 1024, as to whether to try another message counter value. One or more subsequent message counter values can be used to retry validating the decoded message, in case one or more messages of the message type targeted for the receiving ECU were lost in transmission. For example, at 1025, the current message count can be incremented to create a new message count value, and another attempt to decoded the received message can be made, at 1008, using the current session key and the new message count value.

A count of retry attempts can be maintained and can be compared against a retry attempt cap (e.g., the cap can be five). If a next retry attempt would exceed the retry attempt cap, a determination can be made to not try another message counter value, and the message counter for the message can be reset, at 1026, to a saved message count value that existed before other message count values were attempted. At 1028, an alert message can be generated to indicate that the received message is invalid. Invalid messages are generally not sent to target applications in the receiving ECU.

Figure 11:
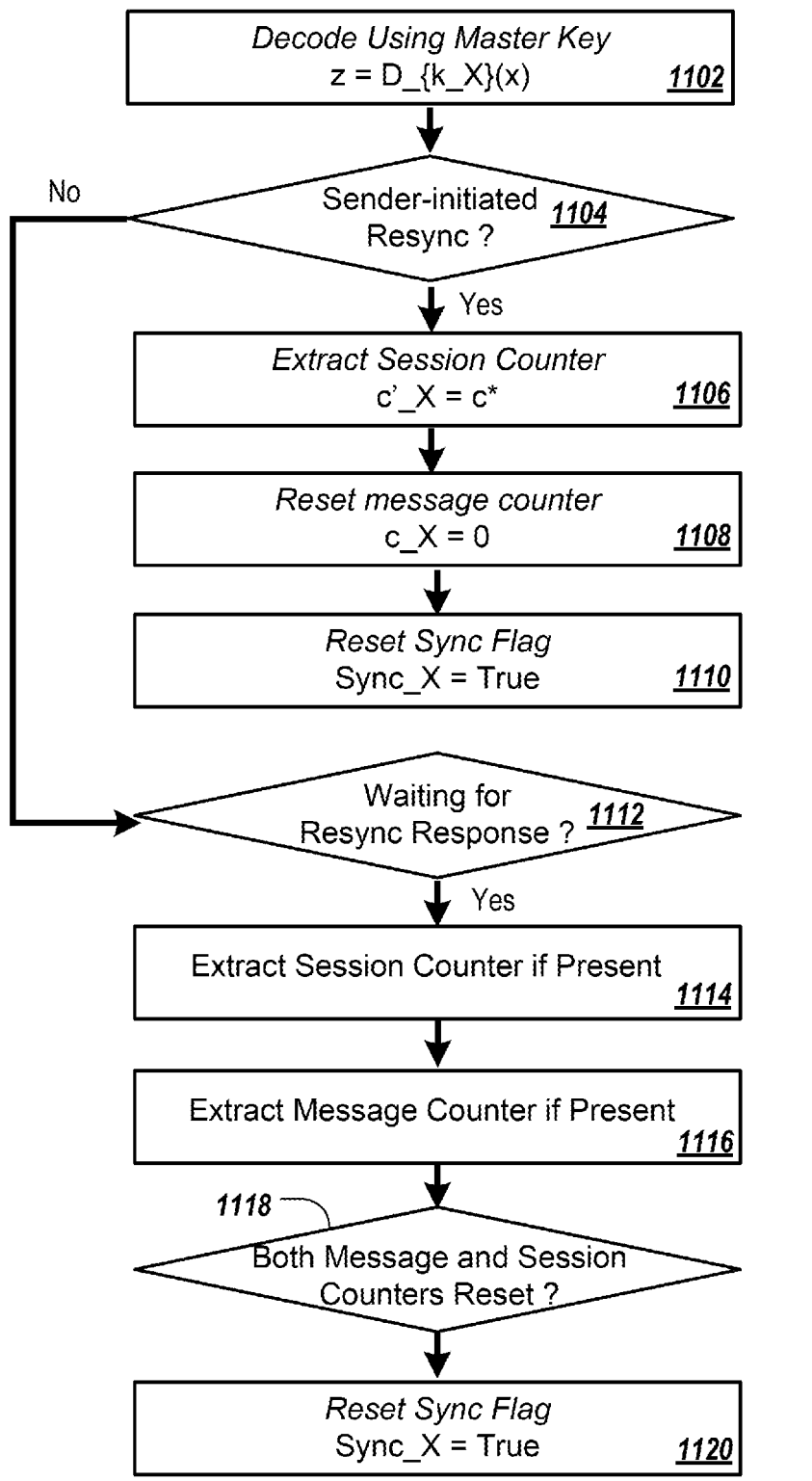
FIG. 11 is a flowchart of an example method for processing received resync-related messages.

FIG. 11 is a flowchart of an example method 1100 for processing received resync-related messages. The example method 1100 is described with regard to ECUs, but can additionally and/or alternatively be used with other types of controllers and across various types of networks. At 1102, a received message of a particular message type is decoded, using the master key for the message type.

At 1104, a determination is made as to whether the decoded message is a sender-initiated resync message. For example, a determination can be made as to whether the decoded message includes a predefined amount of padding for the message type that has been combined with a session counter value.

If the decoded message is a sender initiated resync message, a session counter value c* is extracted from the decoded message, at 1106, and is saved as a new session counter for the message type for the receiving ECU. At 1108, the message counter for the message type is reset (e.g., c_X=0). At 1110, a sync flag for the message type is reset (e.g., Sync_X=True).

If, at 1104, the decoded message is not a sender-initiated resync message, a determination is made, at 1112, as to whether the receiving ECU is waiting for a resync response to a previously-sent resync request. For example, a determination can be made as to whether the Sync_X flag for the message type is False. If the receiving ECU is waiting for a resync response, the decoded message can be evaluated, at 1114, to determine whether the decoded message is a resync response that includes a new session counter, and, if present, the new session counter can be extracted and saved as the current session counter for the message type for the receiving ECU. For example, the decoded message can be evaluated to determine whether the decoded message includes a value that is a combination of a previously-sent random challenge and the new session counter. In some implementations, a flag is set to indicate that a new session counter has been extracted from a resync response message.

At 1116, the decoded message can be evaluated to determine whether the decoded message is a resync response that includes a new message counter, and, if present, the new message counter can be extracted and saved as the current message counter for the message type for the receiving ECU. For example, the decoded message can be evaluated to determine whether the decoded message includes a message counter that has been combined with the previously-sent random challenge value plus one. In some implementations, the decoded message is evaluated to determine whether it includes the new message counter if, at 1114, a new session counter was not extracted from the decoded message. In some implementations, a flag is set to indicate that a new message counter has been extracted from a resync response message.

At 1118, a determination is made as to whether both a message counter and a session counter have been reset (e.g., extracted from respective resync response messages). For example, a determination can be made as to whether both respective flags indicating respective extractions of a session counter and a message counter are set. If both a message counter and a session counter have been reset, the resync flag for the message type is reset (e.g., Sync_X=True). The respective flags indicating extraction of either the session counter or the message counter from resync responses can also be reset.

Figure 12:
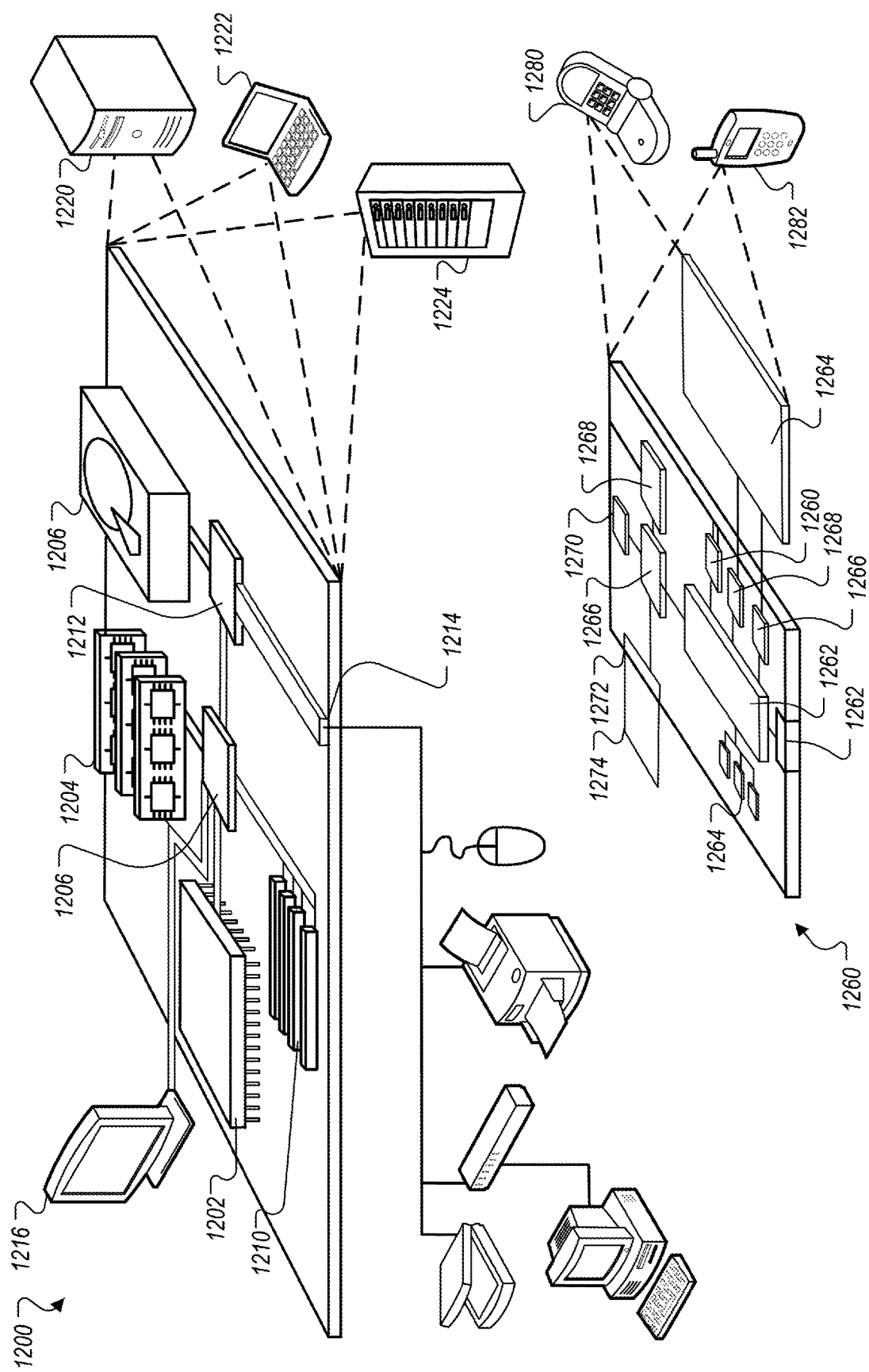
FIG. 12 is a block diagram of example computing devices.

FIG. 12 is a block diagram of example computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1200 is further intended to represent any other typically non-mobile devices, such as televisions or other electronic devices with one or more processors embedded therein or attached thereto. Computing device 1250 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1200 includes a processor 1202, memory 1204, a storage device 1206, a high-speed controller 1208 connecting to memory 1204 and high-speed expansion ports 1210, and a low-speed controller 1212 connecting to low-speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high-speed controller 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, or memory on processor 1202.

The high-speed controller 1208 manages bandwidth-intensive operations for the computing device 1200, while the low-speed controller 1212 manages lower bandwidth-intensive operations. Such allocation of duties is an example only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed bus 1214. The low-speed bus 1214 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as computing device 1250. Each of such devices may contain one or more of computing devices 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The computing device 1250 may also be provided with a storage device, such as a micro-drive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can process instructions for execution within the computing device 1250, including instructions stored in the memory 1264. The processor may also include separate analog and digital processors. The processor may provide, for example, for coordination of the other components of the computing device 1250, such as control of user interfaces, applications run by computing device 1250, and wireless communication by computing device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of computing device 1250 with other devices. External interface 1262 may provide, for example, for wired communication (e.g., via a docking procedure) or for wireless communication (e.g., via Bluetooth® or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to computing device 1250 through expansion interface 1272, which may include, for example, a subscriber identification module (SIM) card interface. Such expansion memory 1274 may provide extra storage space for computing device 1250, or may also store applications or other information for computing device 1250. Specifically, expansion memory 1274 may include instructions to carry out or supplement the processes described above, and may include secure information also. Thus, for example, expansion memory 1274 may be provide as a security module for computing device 1250, and may be programmed with instructions that permit secure use of computing device 1250. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Computing device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1268 (e.g., a radio-frequency transceiver). In addition, short-range communication may occur, such as using a Bluetooth®, WiFi, or other such transceiver (not shown). In addition, GPS receiver module 1270 may provide additional wireless data to computing device 1250, which may be used as appropriate by applications running on computing device 1250.

Computing device 1250 may also communicate audibly using audio codec 1260, which may receive spoken information from a user and convert it to usable digital information. Audio codec 1260 may likewise generate audible sound for a user, such as through a speaker, e.g., in a handset of computing device 1250. Such sound may include sound from voice telephone calls, may include recorded sound (e.g., voice messages, music files, etc.) and may also include sound generated by applications operating on computing device 1250.

The computing device 1250 may be implemented in a number of different forms, as shown in the figure. For example, it may be implemented as a cellular telephone

1280. It may also be implemented as part of a smartphone 1282, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer readable medium including instructions that, when executed by at least one processor, cause the at least one processor to perform operations for deploying a symmetric key cryptography layer of protection in one or more electronic control units (ECUs) among a plurality of ECUs in a vehicle, the operations comprising:
　　receiving, at a first ECU in the vehicle, a single communication from a source external to the first ECU;
　　determining, based on a message type of the single communication, a first symmetric key embedded in a memory of the first ECU, the first symmetric key having been generated using information that was stored on the first ECU prior to receiving the single communication;
　　attempting to decrypt the received single communication using the first symmetric key;
　　determining, based on the attempted decryption, whether the received single communication was encrypted by a second ECU using a second symmetric key corresponding to the first symmetric key; and
　　based on the determining whether the received single communication was encrypted by the second ECU, either:
　　　　validating the received single communication when it is determined to have been encrypted by the second ECU using the second symmetric key; or
　　　　preventing the received single communication from being processed in an application running on the first ECU when the received single communication is not determined to have been encrypted by the second ECU using the second symmetric key.

2. The non-transitory computer readable medium of claim 1, wherein the first and second symmetric keys are identical.

3. The non-transitory computer readable medium of claim 1, wherein the first and second symmetric keys are generated using a common reproducible value.

4. The non-transitory computer readable medium of claim 1, wherein a subset of the plurality of ECUs in the vehicle determined to have a security requirement have a symmetric key corresponding to the first and second symmetric keys.

5. The non-transitory computer readable medium of claim 1, wherein the operations further comprise establishing synchronization between the first and second symmetric keys.

6. The non-transitory computer readable medium of claim 5, wherein the establishing synchronization includes accessing a first message counter stored on the first ECU, the first message counter being synchronized with a second message counter stored on the second ECU.

7. The non-transitory computer readable medium of claim 5, wherein the operations further comprise determining that the established synchronization between the first and second symmetric keys has been lost.

8. The non-transitory computer readable medium of claim 7, wherein the operations further comprise reestablishing synchronization between the first and second symmetric keys.

9. The non-transitory computer readable medium of claim 1, wherein the validating the received single communication includes comparing a result of the attempted decryption with expected validation data associated with the received single communication.

10. The non-transitory computer readable medium of claim 1, wherein the operations further comprise generating an incident alert when the received single communication is not determined to have been encrypted by the second ECU using the second symmetric key.

11. A computer-implemented method for deploying a symmetric key cryptography layer of protection in one or more electronic control units (ECUs) among a plurality of ECUs in a vehicle, the method comprising:
receiving, at a first ECU in the vehicle, a single communication from a source external to the first ECU;
determining, based on a message type of the single communication, a first symmetric key embedded in a memory of the first ECU, the first symmetric key having been generated using information that was stored on the first ECU prior to receiving the single communication;
attempting to decrypt the received single communication using the first symmetric key;
determining, based on the attempted decryption, whether the received single communication was encrypted by a second ECU using a second symmetric key corresponding to the first symmetric key; and
based on the determining whether the received single communication was encrypted by the second ECU, either:
validating the received single communication when it is determined to have been encrypted by the second ECU using the second symmetric key; or
preventing the received single communication from being processed in an application running on the first ECU when the received single communication is not determined to have been encrypted by the second ECU using the second symmetric key.

12. The computer-implemented method of claim 11, wherein the first and second symmetric keys are identical.

13. The computer-implemented method of claim 11, wherein the first and second symmetric keys are generated using a common reproducible value.

14. The computer-implemented method of claim 11, wherein a subset of the plurality of ECUs in the vehicle determined to have a security requirement have a symmetric key corresponding to the first and second symmetric keys.

15. The computer-implemented method of claim 11, further comprising establishing synchronization between the first and second symmetric keys.

16. The computer-implemented method of claim 15, wherein the establishing synchronization includes accessing a first message counter stored on the first ECU, the first message counter being synchronized with a second message counter stored on the second ECU.

17. The computer-implemented method of claim 15, further comprising determining that the established synchronization between the first and second symmetric keys has been lost.

18. The computer-implemented method of claim 17, further comprising reestablishing synchronization between the first and second symmetric keys.

19. The computer-implemented method of claim 11, wherein the validating the received single communication includes comparing a result of the attempted decryption with expected validation data associated with the received single communication.

20. The computer-implemented method of claim 11, further comprising generating an incident alert when the received single communication is not determined to have been encrypted by the second ECU using the second symmetric key.

* * * * *